(12) United States Patent
D'Arrigo et al.

(10) Patent No.: US 6,218,820 B1
(45) Date of Patent: Apr. 17, 2001

(54) FREQUENCY TRANSLATOR USABLE IN A SWITCHING DC-DC CONVERTER OF THE TYPE OPERATING AS A VOLTAGE REGULATOR AND AS A BATTERY CHARGER, AND METHOD OF FREQUENCY TRANSLATION THEREFOR

(75) Inventors: Angelo D'Arrigo, Catania; Salvatore Capici, Barrafranca; Filippo Marino, Tremestieri Etneo; Francesco Pulvirenti, Acireale, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/568,609

(22) Filed: May 10, 2000

(30) Foreign Application Priority Data

May 10, 1999 (EP) ................................. 99830285

(51) Int. Cl.[7] ............................. G05F 1/40; G05F 1/573
(52) U.S. Cl. .......................... 323/285; 323/284; 323/276; 363/56
(58) Field of Search .............................. 363/50, 55, 56; 323/276, 277, 280, 284, 285, 288

(56) References Cited

U.S. PATENT DOCUMENTS

| | | | |
|---|---|---|---|
| 4,975,823 | 12/1990 | Rilly et al. | 363/56 |
| 5,408,402 | 4/1995 | Nonnenmacher | 363/21 |
| 5,465,201 | * 11/1995 | Cohen | 363/56 X |
| 5,490,055 | * 2/1996 | Boylan et al. | 323/285 X |
| 5,612,858 | 3/1997 | Weinmeier et al. | 363/21 |

* cited by examiner

Primary Examiner—Jessica Han
(74) Attorney, Agent, or Firm—Theodore E. Galanthay; Robert Iannucci; Seed IP Law Group PLLC (57) ABSTRACT

A frequency translator is usable in a switching DC-DC converter of the type operating as a voltage regulator and as a battery charger. The frequency translator receives at inputs a division voltage (VFB) proportional to a present value of the output voltage (VOUT) of the DC-DC converter, a reference voltage (VREF) correlated to a nominal value of the output voltage (VOUT), and a limiting signal (VL) indicative of a normal operation or of current limitation operation of the DC-DC converter, and supplies at an output a bias current (IBIAS) which is supplied to an input of an oscillator supplying at an output a comparison signal (VC) presenting a periodic pattern with a frequency which is correlated to the bias current (IBIAS). In particular, the frequency translator operates in a way such as to regulate a frequency translation of the comparison signal (VC) as a function of the difference between the division voltage (VFB) and the reference voltage (VREF) only when the DC-DC converter is operating in the current limitation condition.

20 Claims, 6 Drawing Sheets

FREQUENCY TRANSLATOR USABLE IN A SWITCHING DC-DC CONVERTER OF THE TYPE OPERATING AS A VOLTAGE REGULATOR AND AS A BATTERY CHARGER, AND METHOD OF FREQUENCY TRANSLATION THEREFOR

TECHNICAL FIELD

The present invention refers to a frequency translator usable in a switching DC-DC converter of the type operating as a voltage regulator and as a battery charger, and to a method of frequency translation therefor.

BACKGROUND OF THE INVENTION

Figure 1:
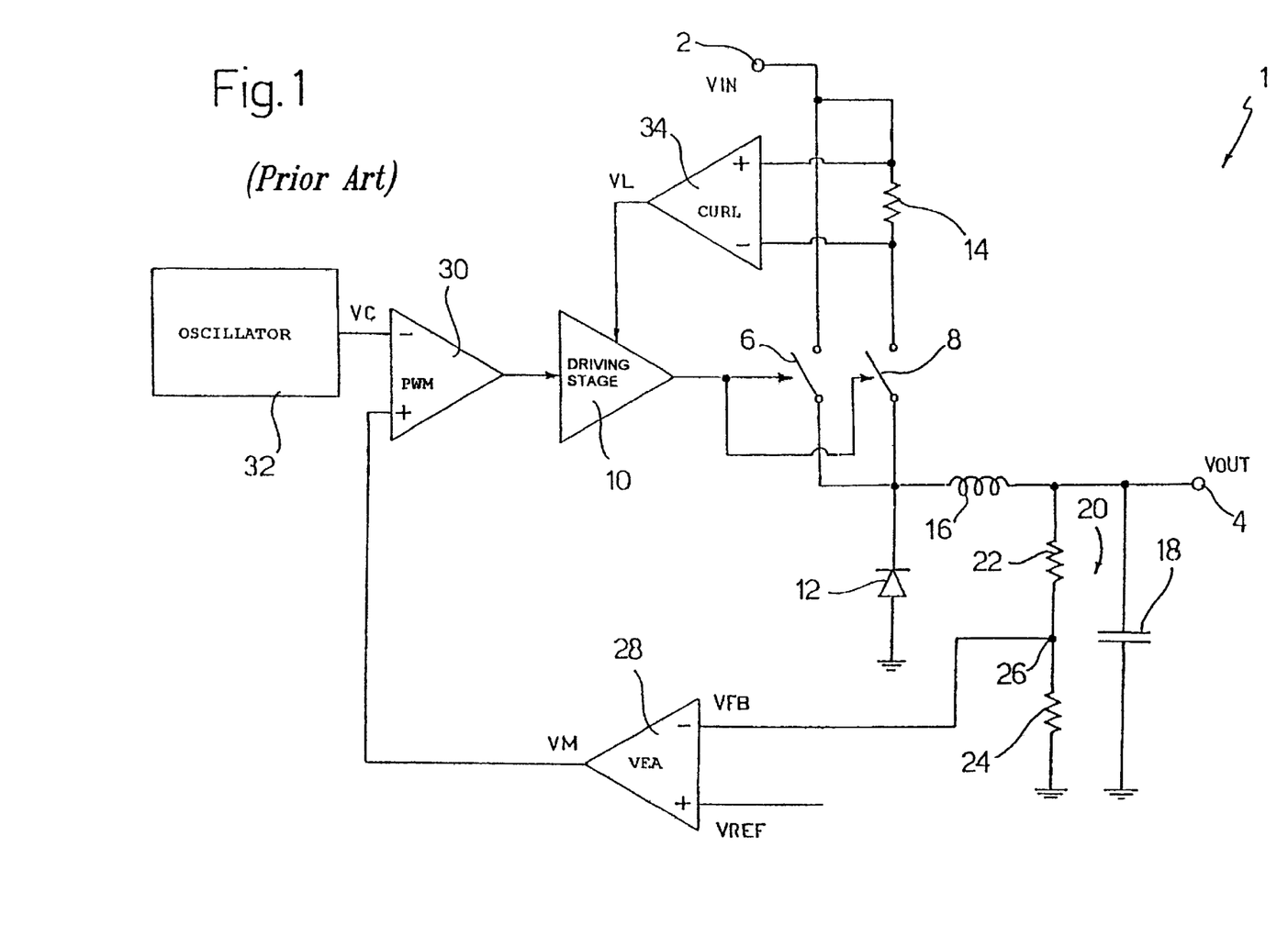
FIG. 1 shows a circuit diagram of a known DC-DC converter usable as a voltage regulator.

FIG. 1 illustrates, and indicates as a whole by the reference number 1, a known step-down DC-DC converter usable as a voltage regulator. In particular, to provide an example, in FIG. 1 a DC-DC converter is illustrated having a Buck circuit configuration; however, this should not be deemed limiting, in that considerations altogether similar to the ones that are made in what follows for this type of circuit configuration also apply to DC-DC converters having Boost and Flyback circuit configurations.

According to what is illustrated in FIG. 1, the DC-DC converter comprises an input terminal 2, set, when in use, at an input voltage VIN, and an output terminal 4 supplying an output voltage VOUT lower than the input voltage VIN.

The DC-DC converter 1 comprises a first and a second switch 6, 8, typically formed of bipolar transistors or p-channel or n-channel MOSFET transistors, the opening and closing whereof are controlled in phase by a driving stage 10. In particular, the first switch 6 presents a first terminal connected to the input terminal 2 of the DC-DC converter 1, and a second terminal connected, via a diode 12, to ground, whilst the second switch 8 presents a first terminal also connected to the input terminal 2 of the DC-DC converter 1 via a sense resistor 14, and a second terminal connected, via the diode 12, to ground.

The DC-DC converter 1 further comprises an inductor 16 connected between the second terminals of the switches 6 and 8 and the output terminal 4; a capacitor 18 connected between the output terminal 4 and ground; and a voltage divider 20 formed of two resistors 22, 24 connected between the output terminal 4 and ground and presenting an intermediate node 26 on which a division voltage VFB is present, which is proportional, through the division ratio, to the output voltage VOUT supplied by the DC-DC converter 1.

The DC-DC converter 1 moreover comprises a differential voltage error amplifier (VEA) 28 presenting an inverting terminal connected to the intermediate node 26 of the voltage divider 20 and receiving from the latter the division voltage VFB, a non-inverting terminal receiving a reference voltage VREF, and an output terminal supplying an intermediate voltage VM and connected to a non-inverting terminal of a differential comparator 30, known as PWM (Pulse Width Modulator) comparator, and hereinafter indicated by this name, which in turn presents an inverting terminal connected to the output terminal of an oscillator 32 supplying a comparison voltage VC presenting a sawtooth waveform and having a preset frequency upon which the switching frequency of the DC-DC converter 1 depends, and an output terminal connected to the input of the driving stage 10 of the switches 6 and 8.

In particular, the PWM comparator 30 basically acts as a pulse width modulator and supplies at an output a voltage having a square waveform, the duty cycle whereof is a function of the voltage supplied by the voltage error amplifier 28, and the frequency whereof depends upon the frequency of the comparison voltage VC supplied by the oscillator 32.

Finally, the DC-DC converter 1 comprises a fixed threshold current limiting stage having the purpose of protecting the DC-DC converter 1 against current overloads and basically consisting of a differential comparator 34, hereinafter indicated as CURL comparator, presenting an inverting terminal and a non-inverting terminal connected across the sense resistor 14 and an output terminal issuing a limiting signal VL supplied to the driving stage 10; in particular, the CURL comparator 34 carries out the comparison between the voltage present across the sense resistor 14 and a preset reference voltage programmed inside it: if the voltage present across the sense resistor 14 is less than or equal to the reference voltage programmed inside it, then the limiting signal VL switches to a low logic level indicative of the absence of overloads, and the driving stage 10 continues to operate in a normal way, controlling opening and closing of the switches 6 and 8 at a nominal switching frequency correlated to the frequency of the comparison voltage VC supplied by the oscillator 32, whereas if the voltage present across the sense resistor 14 is greater than the reference voltage programmed inside it, then the limiting signal VL switches to a high logic level indicative of the presence of overloads, and, in response to the switching of the limiting signal VL from the low logic level to the high logic level, the driving stage 10 controls opening of the switches 6 and 8, so as to interrupt the current supplied to the DC-DC converter 1.

The opening of the switch 8 causes the voltage across the sense resistor 14 to become zero, and thus causes the limiting signal VL generated by the CURL comparator 34 to switch again to the low logic level, and consequently the driving stage 10 to return to conditions of normal operating.

As a result, as long as the overload persists, the limiting signal VL supplied by the CURL comparator 34 continues to switch between the high and low logic levels, thus generating a pulse train which, when supplied to the driving stage 10, causes switching of the operation of the DC-DC converter 1 between a normal operation, in which opening and closing of the switches 6 and 8 is controlled at a preset frequency correlated to that of the sawtooth voltage supplied by the PWM comparator 30, and an current limitation operation, in which opening of the switches 6 and 8 is controlled in order to interrupt the current supplied to the DC-DC converter 1.

The operation of the DC-DC converter 1 is in itself known and will here be referred to solely as regards the aspects necessary for understanding the problems lying at the basis of the present invention. In particular, the DC-DC converter 1 presents a single operating mode in which the voltage error amplifier 28 carries out regulation of the output voltage VOUT so that this remains constant as the current required by the load connected to the output terminal of the DC-DC converter 1 varies.

Figure 2:
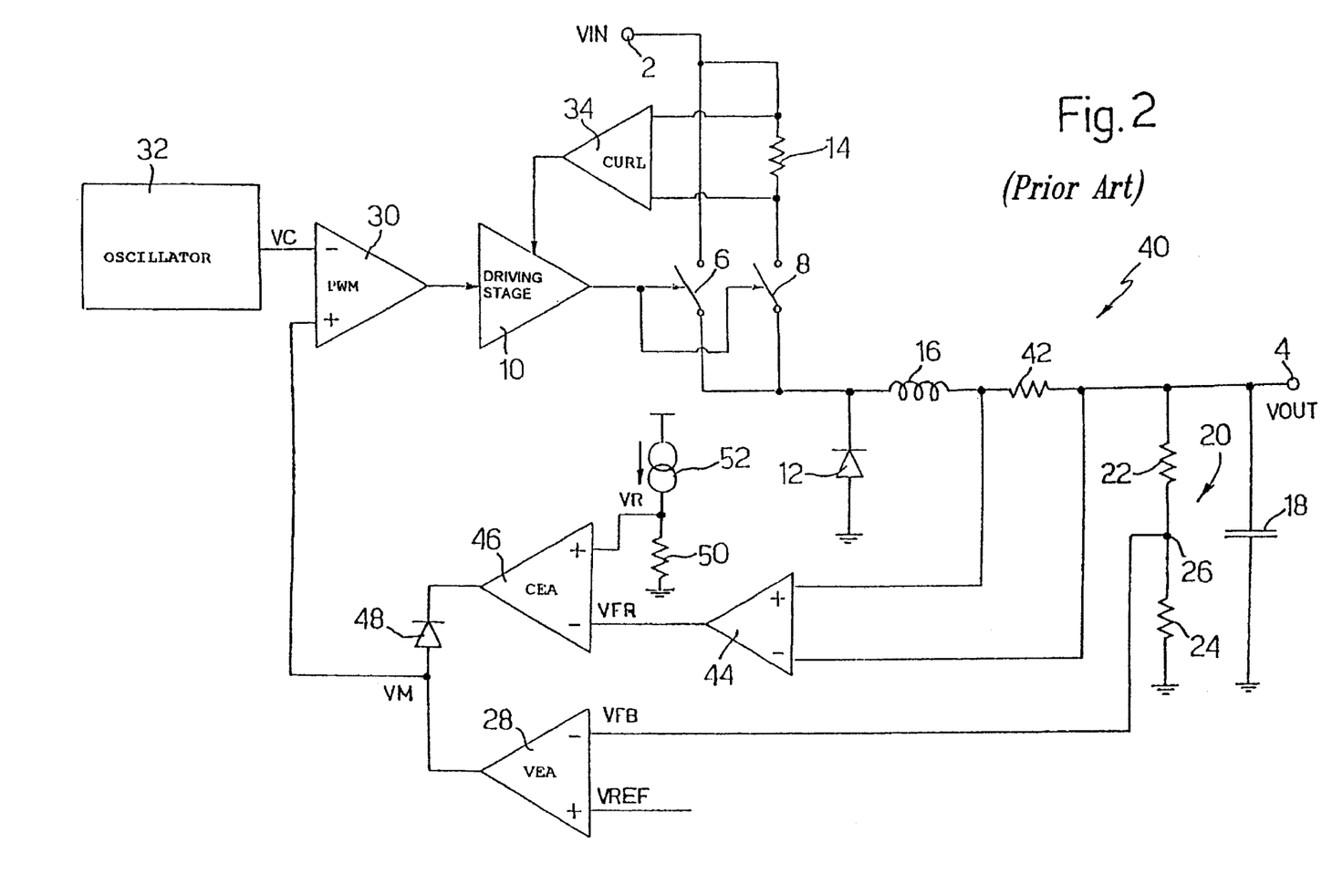
FIG. 2 shows a circuit diagram of a known DC-DC converter usable as a battery charger.

In FIG. 2 there is illustrated and indicated by 40 a known step-down DC-DC converter usable as a battery charger, in which identical parts or parts equivalent to the ones of the DC-DC converter 1 are designated with the same reference numbers.

In particular, the DC-DC converter 40 differs from the DC-DC converter 1 by further comprising a sense resistor 42 connected in series to the inductor 16 and interposed between the inductor 16 and the output terminal 4 of the DC-DC converter 40; a filtering stage 44, made typically using an operational amplifier and presenting a first input terminal and a second input terminal connected across the sense resistor 42, and an output terminal supplying a voltage equal to the filtered voltage VFR present across the sense resistor 42; and a differential current error amplifier (CEA) 46 presenting an inverting terminal connected to the output terminal of the filtering stage 44, a non-inverting terminal receiving a reference voltage VR, and an output terminal connected to the inverting terminal of the PWM comparator 30 through a decoupling diode 48, which presents the anode terminal connected to the inverting terminal of the PWM comparator 30 and the cathode terminal connected to the output terminal of the current error amplifier 46.

In particular, the reference voltage VR is generated by causing a constant current, supplied by a current generator 52 connected in series to a resistor 50, to flow in the resistor 50 itself; the reference voltage thus obtained is then taken across the resistor 50.

The operation of the DC-DC converter 40 is in itself known and will here be referred to solely as regards the aspects necessary for understanding the problems lying at the basis of the present invention. In particular, it is pointed out that the DC-DC converter 40 presents two operating modes. A first operating mode is that in which the current error amplifier prevails over the voltage error amplifier and carries out regulation of the battery charging current, during which the charging current is constant at the programmed value and the voltage present across the battery increases from the initial value, typically zero, to its full charge value, whereas the second operating mode is that in which the voltage error amplifier prevails over the current error amplifier and carries out regulation of the voltage of the battery, during which the charging current decreases until it goes to zero and the battery voltage remains fixed at the full charge value.

Both of the DC-DC converters described above present a drawback due to the fact that the time of intervention of the CURL comparator 34 for limiting the current supplied by the DC-DC converters when overloads are present at output (for example, upon switching-on of the DC-DC converters when the capacitor 18 must be charged) is not zero and depends on the response time with which the DC-DC converters react to such variations.

Consequently, in the cases where heavy overloads or short circuits at output, or else at switching-on, occur, the CURL comparator 34 by itself does not suffice to limit the output current in that, in these conditions, the inductor 16 is charged with a current having a slope greater than the slope with which it is discharged, thus leading to a divergence of the output current.

In the literature there exist various methods for creating a current limitation system that is effective against short circuits and overloads.

A very well known method is based upon the so-called principle of frequency translation, i.e., based upon the reduction of the switching frequency of the DC-DC converter in the presence of overloads or short circuits, that is upon the reduction of the switching frequencies of the switches 6 and 8.

Figure 3:
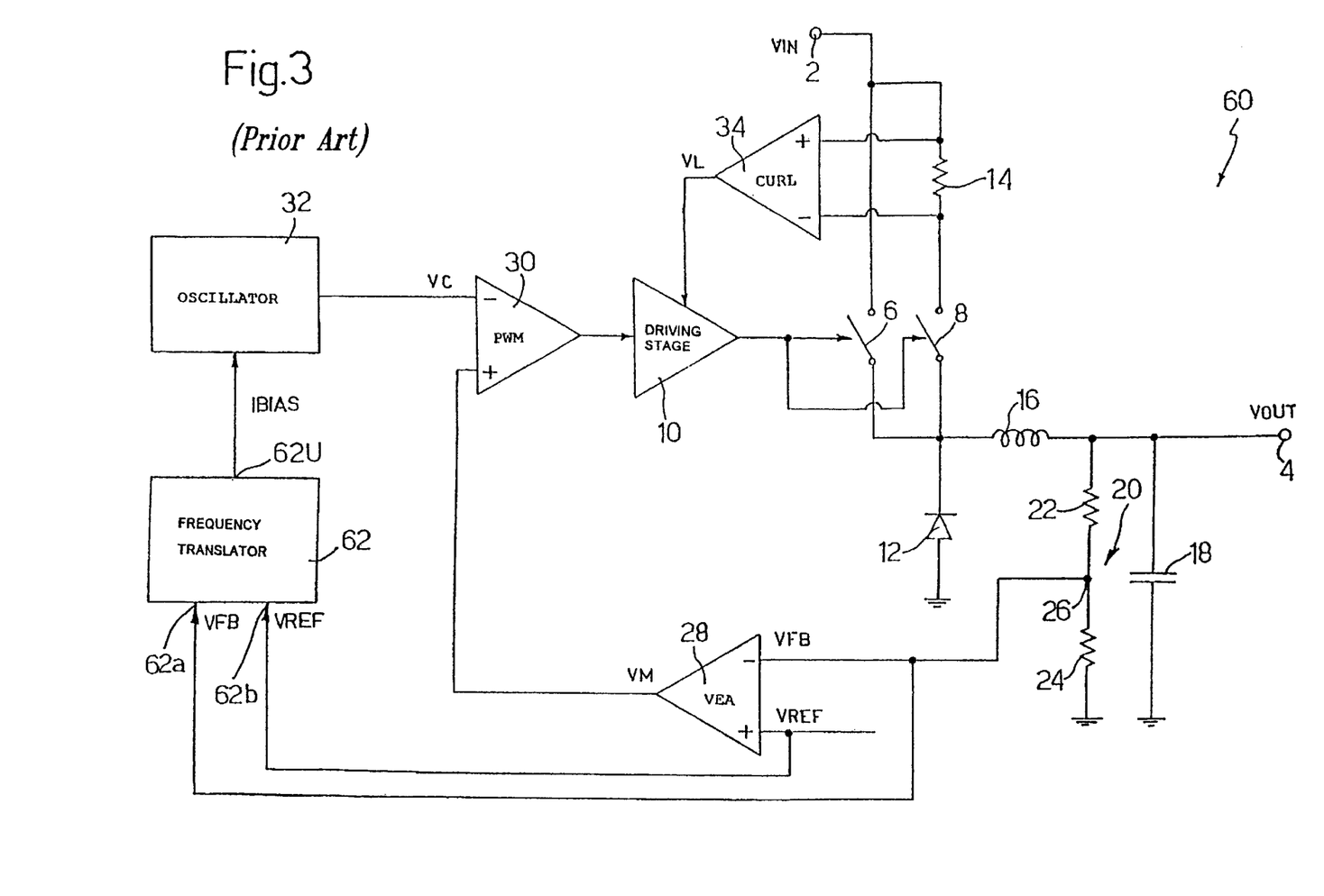
FIG. 3 shows a circuit diagram of a known DC-DC converter usable as a voltage regulator and provided with a known frequency translator.

In FIG. 3 there is illustrated and designated by 60 a frequency translation DC-DC converter, usable as a voltage regulator.

The DC-DC converter 60 presents a circuit topology very similar to that of the DC-DC converter 1; for this reason, identical parts or parts equivalent to those of the DC-DC converter 1 will be identified with the same reference numbers.

The DC-DC converter 60 differs from the DC-DC converter 1 by further comprising a frequency translator 62 presenting a pair of input terminals 62a, 62b connected to the inverting and non-inverting terminals of the voltage error amplifier 28 and receiving, respectively, the division voltage VFB and the reference voltage VREF, and an output terminal 62u issuing a translation regulating signal supplied to an input terminal of the oscillator 32 and consisting of a bias current IBIAS for the oscillator 32 itself, which is designed so as to supply at an output a comparison voltage VC of a sawtooth or triangular waveform, the frequency whereof is proportional to the bias current IBIAS.

The operation of the DC-DC converter 60 is in itself known and will here be referred to solely as regards the aspects necessary for understanding the problems lying at the basis of the present invention. In particular, in conditions of short circuit or switching-on of the DC-DC converter 60, the output voltage VOUT is initially zero, in that the capacitor 18 is discharged, the bias current IBIAS supplied to the oscillator 32 assumes a minimum value, the comparison voltage VC supplied by the oscillator 32 consequently assumes a minimum value, and hence the switching frequency of the switches 6 and 8, which is controlled by the driving stage 10 and is in turn a function of the frequency of the comparison voltage VC, also assumes its minimum value.

As the output voltage VOUT increases, the bias current IBIAS increases accordingly, and the switching frequency of the switches 6, 8 tends to go to its nominal value.

A frequency translator 62 of the type described above is not, however, usable in the DC-DC converter 40 operating as a battery charger on account of the presence of the dual operating mode, i.e., as a current regulator and as a voltage regulator, of the DC-DC converter 40.

In fact, in both operating modes, under normal operating conditions, the DC-DC converter 40 should function at the nominal switching frequency; instead, with the frequency translation modality illustrated in FIG. 3 this is not possible in that, during the current regulation operating mode, since the output voltage VOUT varies from the zero value to the nominal value, the frequency translator 62 would control translation of the switching frequency of the DC-DC converter 40 even though no overload is present at output.

SUMMARY OF THE INVENTION

An embodiment of the present invention provides a frequency translator usable in a switching DC-DC converter of the type operating as a voltage regulator and as a battery charger.

Another embodiment of the present invention provides a frequency translation method that may be used in a switching DC-DC converter of the type operating as a voltage regulator and as a battery charger.

Another embodiment of the present invention provides a switching DC-DC converter operating as a voltage regulator and as a battery charger.

According to embodiments of the present invention disclosed herein, a limiting signal VL is supplied to the frequency translator in such a way as it may control the translation of the frequency of a comparison signal VC as a function of the difference between a reference voltage VREF and a division voltage VFB solely when the DC-DC converter is operating in a current limiting condition. In this way, the frequency translator may be used also in DC-DC converters operating as battery chargers, in that, during the current limiting condition, the limiting signal VL is zero and inhibits frequency translation.

BRIEF DESCRIPTION OF THE DRAWINGS

For a better understanding of the present invention, a preferred embodiment thereof is now described, simply with the purpose of providing a non-limiting example, with reference to the attached drawings, in which.

DETAILED DESCRIPTION

Figure 4:
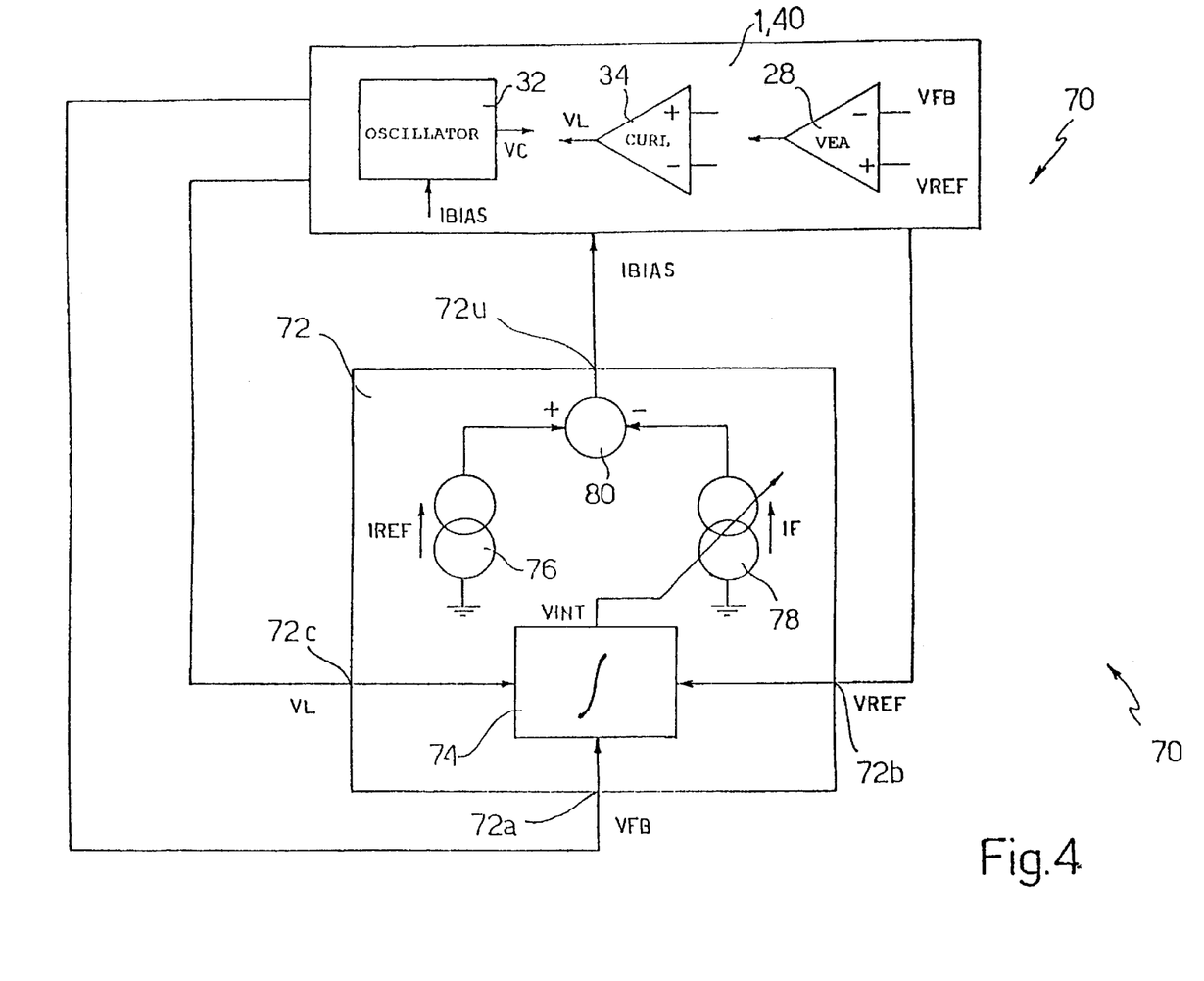
FIG. 4 shows a circuit diagram of a frequency translator usable in a DC-DC converter of the type operating as a voltage regulator and as a battery charger.

In FIG. 4 there is illustrated, and indicated by 72, a frequency translator made according to an embodiment of the present invention and usable in a DC-DC converter, indicated by 70, of the type operating as a voltage regulator and as a battery charger. In particular, in FIG. 4 all the remaining circuit structure of the DC-DC converter 70 that may indifferently be either that of the DC-DC converter 1 or that of the DC-DC converter 40 previously described is shown schematically as a rectangle indicated by the reference numbers 1, 40, in which only the components necessary for the understanding of the present invention are shown.

In particular, the frequency translator 72 presents, in addition to the input terminals, indicated in the figure by 72a and 72b, receiving the division voltage VFB and the reference voltage VREF, also a third input terminal, indicated by 72c, receiving from the CURL comparator 34 the limiting signal VL indicative of normal operation or of current limitation operation of the DC-DC converter 70 and controls a translation of the frequency of the comparison voltage VC supplied by the oscillator 32 as a function of the difference between the reference voltage VREF and the division voltage VFB only when the DC-DC converter 70 is in current limitation operation, i.e., only if on the limiting signal VL there is present the pulse train that is indicative of this operating condition.

In this way, the frequency translator 72 can be used also in DC-DC converters operating as battery chargers. In fact, during the current regulation phase, in which the output voltage VOUT increases from zero to its steady state value, the limiting signal VL assumes a zero value, and thus prevents carrying out of the frequency translation of the comparison voltage VC during this phase.

As shown in FIG. 4, the frequency translator 72 comprises an integrating stage 74 receiving at the inputs the division frequency VFB, the reference voltage VREF and the limiting signal VL, and supplying at an output a current limiting signal VINT obtained as follows:

$$VINT = \int VL(t) \cdot \left(1 - \frac{VFB}{VREF}\right) dt = \int VL(t) \cdot \left(\frac{VREF - VFB}{VREF}\right) dt$$

The frequency translator 72 further comprises a first current generator 76 supplying a constant reference voltage IREF; a second current generator 78 receiving at an input the current limiting signal VINT and supplying a limitation current IF which is variable and correlated to the current limiting signal VINT; and a subtracting stage 79 receiving at an input the reference current IREF and the limitation current IF and supplying at an output the bias current IBIAS for the oscillator 32 equal to the difference between the current IREF and the current IF.

In particular, the reference current IREF supplied by the first current generator 76 presents an amplitude such that, if supplied to the oscillator 32 as bias current, it would determine the generation of a comparison voltage VC having nominal frequency, whilst the limitation current IF supplied by the second current generator 78 is proportional to the amplitude of the current limiting signal VINT and ranges between a minimum value of zero to a maximum value lower than the value of the reference current IREF.

The operation of the frequency translator 72 is as follows. In normal operating conditions, i.e., in the absence of overloads or short circuits, or following upon switching-on of the DC-DC converter, the limiting signal VL is zero, the current limiting signal VINT is zero, the limitation current IF is zero, and hence the bias current IBIAS is equal to the reference current IREF.

In these conditions, therefore, the frequency of the comparison signal VC, and consequently the switching frequency of the DC-DC converter, is the nominal one determined in the design phase.

In conditions of overload, such as short circuits at output, or else upon switching-on, the DC-DC converter 70 enters the current limitation phase, and this condition is detected by the CURL comparator 34, which supplies at an output a limiting signal VL on which there is present a pulse train indicative of this condition.

The integrating stage 74 carries out integration of the limiting signal VL weighted with the term (1−VFB/VREF) and generates at an output the current limiting signal VINT which is supplied to the current generator 78, which generates at an output a limitation current IF proportional to the current limiting signal VINT.

In the subtracting stage 79, the current IF is subtracted from the current IREF, thus generating a bias current IBIAS smaller than the reference current IREF, which, when supplied to the oscillator 32, determines a reduction in the frequency of the comparison voltage VC, and hence in the switching frequency of the DC-DC converter.

The term (1−VFB/NVREF) expresses the dependence of the switching frequency of the DC-DC converter 70 upon the output voltage VOUT; since, in fact, the division voltage VFB ranges in use between a zero value and a value equal to that of the reference voltage VREF, the term (1−VFB/NVREF) accordingly varies between a value of unity and a value of zero. As the output voltage VOUT varies between zero and its steady state value, the division voltage VFB increases from the zero value to a value equal to that of the reference voltage VREF, the term (1−VFB/VREF) decreases from 1 to 0, the current limiting signal VINT decreases until it zeroes whatever the value of the limiting signal VL, and hence the limitation current IF decreases until it zeroes, thus determining the increase in the frequency of the comparison voltage VC, and consequently of the switching frequency of the DC-DC converter 70 from its minimum value to its nominal value.

This prevents latch-up phenomena, i.e., phenomena in which the output voltage VOUT gets blocked at a value lower than the nominal value, which may occur upon switching-on if the switching frequency is initially lower than the nominal frequency.

Figure 5:
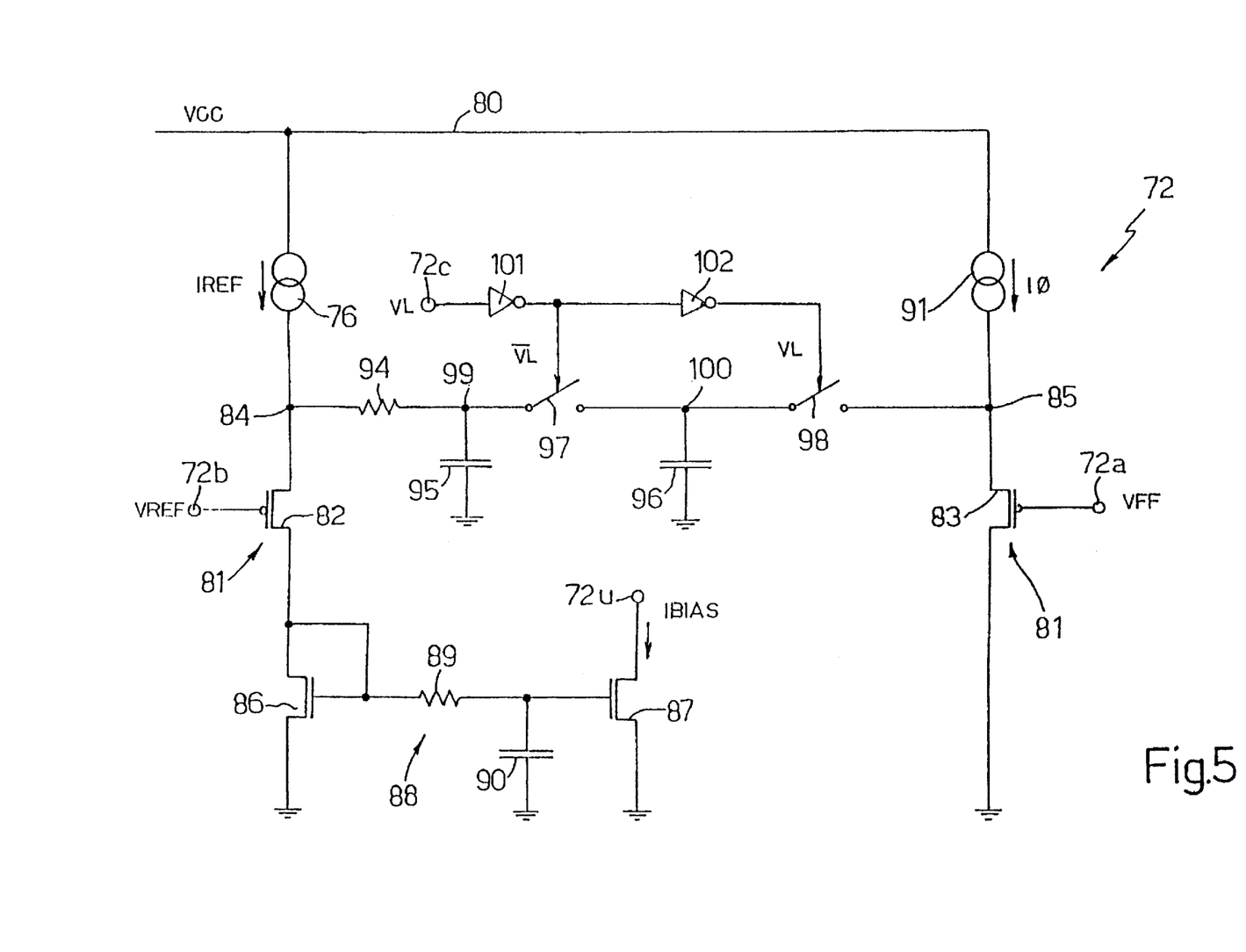
FIG. 5 shows a more detailed circuit diagram of the frequency translator of FIG. 4.

FIG. 5 shows in detail the circuit diagram of the frequency translator 72, in which parts that are identical or equivalent to those of FIG. 4 are identified by the same reference numbers.

According to what is illustrated in this figure, the frequency translator 72 comprises a supply line 80 set at the voltage VCC; an input differential stage 81 formed of a pair of PMOS transistors 82, 83 having the same dimensions and having gate terminals receiving, respectively, the reference voltage VREF and the division voltage VFB, drain terminals connected to respective internal nodes 84, 85, and source terminals connected, respectively, to one of two NMOS transistors 86, 87 forming a current mirror 88, and to ground.

In particular, the transistors 86, 87 have source terminals connected to ground and gate terminals connected together via a resistor 89. In addition, the transistor 86 constitutes the load of the transistor 82 and is diode-connected, i.e., it has the drain terminal connected to its own gate terminal, whilst the transistor 87 has the gate terminal connected to ground via a capacitor 90 and supplies on its own drain terminal the bias current IBIAS for the oscillator 32.

Between the supply line 80 and the node 84 is connected the current generator 76 supplying the reference voltage IREF, whilst between the supply line 80 and the node 85 is connected a current generator 91 supplying a constant current I0 equal to the reference current IREF. The current generators 76 and 91 are in practice made by means of a single current mirror provided with two repeating branches.

Between the nodes 84 and 85 there is moreover connected a network formed of a resistor 94, two capacitors 95, 96 and two switches, 97, 98, made, for example, using NMOS transistors. In particular, the resistor 94 is connected between the node 84 and one node 99; the capacitor 95 is connected between the node 99 and ground; the switch 97 is connected between the node 99 and one node 100; the capacitor 96 is connected between the node 100 and ground; and finally the switch 98 is connected between the node 100 and the node 85.

The switches 97 and 98 are controlled in counterphase, and in particular the switch 97 is controlled by the inverted limiting signal $\overline{VL}$ obtained by inverting, via an inverter 101, the limiting signal VL supplied on the input terminal 72c, whilst the switch 98 is controlled by the limiting signal VL obtained by inverting, via an inverter 102, the inverted limiting signal $\overline{VL}$ supplied by the inverter 101.

The resistor 94, the capacitors 95, 96, and the switches 97, 98 form the integrating stage 74, whilst the transistors 82, 83 implement the relation VREF-VFB to be used in the integration.

Operation is as follows. When the DC-DC converter is not in the current limitation phase, the limiting signal VL is at a low logic level and the negated limiting signal $\overline{VL}$ is at a high logic level; consequently, the switch 97 is closed and the switch 98 is open, the capacitors 95 and 96 are parallel-connected and, via the resistor 94, are charged to the voltage present on the node 84.

In this situation, the bias current IBIAS supplied to the oscillator 32 is equal to the reference current IREF, and the switching frequency of the DC-DC converter 70 is equal to its nominal value.

When a condition of overload occurs, the DC-DC converter 70 enters the current limitation phase, and hence the limiting signal VL switches to the high logic level, thus driving opening of the switch 97 and closing of the switch 98. The capacitor 96 is thus discharged until the voltage across it is equal to the voltage on the node 85, which is equal to VFB+VGS, where VGS is the voltage present between the gate terminal and the source terminal of the transistor 83.

The voltage of the node 85 is lower than the voltage of the node 84 in that, since the DC-DC converter 70 is in an overload condition, and hence out of regulation, the division voltage VFB is lower than the reference voltage VREF.

When the limiting signal VL switches again to the low logic level, the switch 97 closes and the switch 98 opens, and thus the capacitor 95 is discharged on the capacitor 96, so causing the voltage of the node 99 and that of the node 84 to decrease.

If the capacitor 96 is designed so that its capacitance is sufficiently small as compared to that of the capacitor 95, then as the successive pulses present on the limiting signal VL are sent to the switches 97 and 98, the consequent phases of charging and discharging of the capacitors 95 and 96 will bring about integration of the pulses, causing the voltage of the node 84 to decrease continuously starting from its initial value down to a lower value.

The transistor 82 will thus present a voltage VGS increasingly smaller, and hence the current flowing in the transistor will be IREF-IF, and this will translate the switching frequency to its minimum value.

FIGS. 6 to 9 show the effects of an overload on the bias current IBIAS and on the switching frequency of the DC-DC converter.

Figure 6:
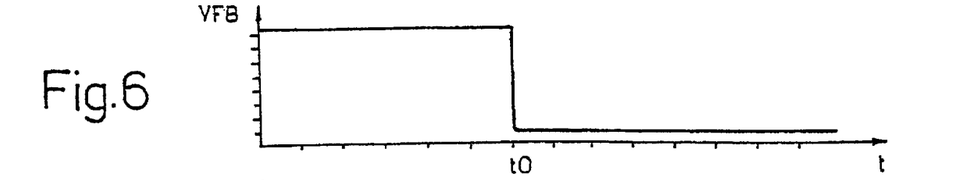
FIGS. 6–12 show patterns of electrical quantities of the frequency translator of FIG. 5.
Figure 7:
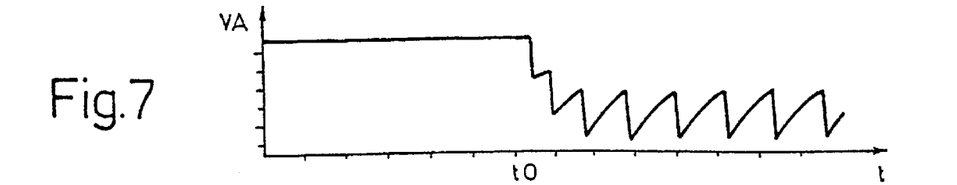
Figure 8:
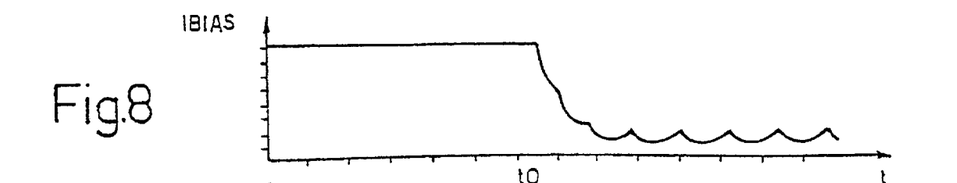

In particular, as may be noted, in the case of an overload that occurs at the instant of time indicated in the figure by to, the division voltage VFB decreases rapidly to a very small value following a substantially step-like pattern, as shown in FIG. 6; the voltage VA present on the node 84 decreases following the pattern shown in FIG. 7; and the bias current IBIAS decreases progressively following the pattern shown in FIG. 8.

Figure 9:
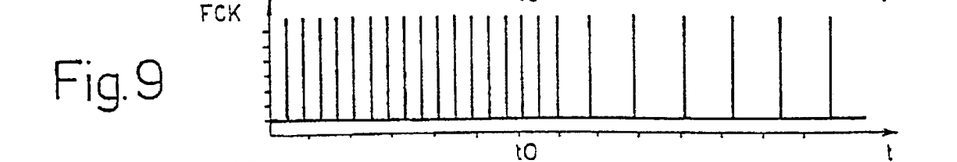

FIG. 9, instead, illustrates the decrease in the clock frequency FCK with which the oscillator 32 operates internally following upon a condition of overload. The frequency of the sawtooth comparison voltage VC supplied as output from the oscillator 32 will consequently undergo a reduction similar to that of the clock frequency illustrated in FIG. 9.

Figure 10:
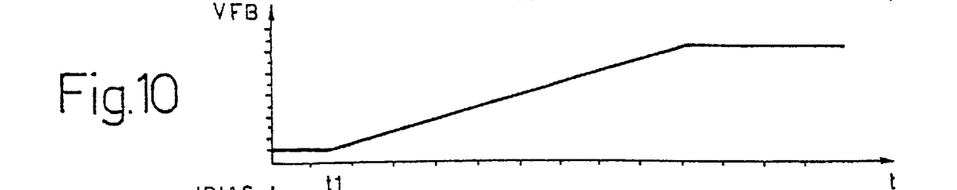
Figure 11:
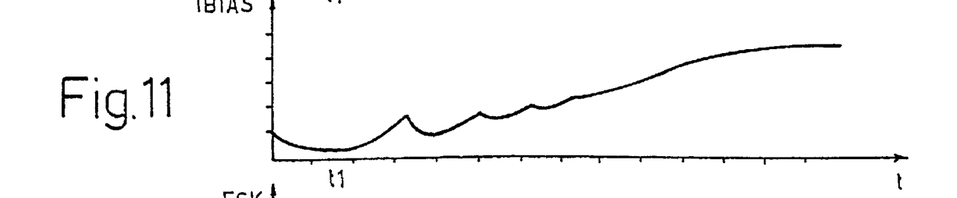
Figure 12:
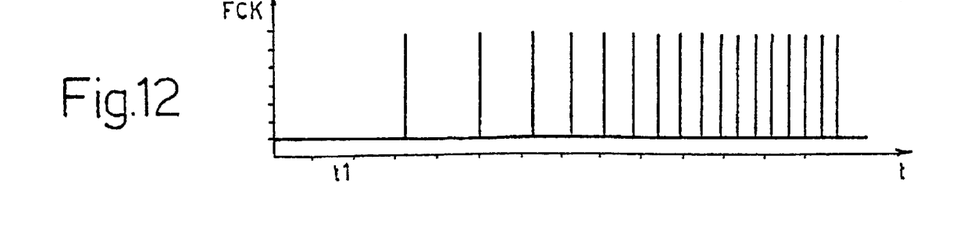

FIGS. 10, 11 and 12 show, respectively, the pattern of the division voltage VFB, the bias current, and the clock frequency of the oscillator 32 from the instant, indicated by t1, in which the overload condition ceases.

It should be noted that the minimum value of the clock frequency FCK of the oscillator 32, and hence of the comparison voltage VC supplied by the oscillator, and the degree of continuity with which the said frequency and voltage go back to their nominal values depend upon the resistance of the resistor 94 and upon the capacitance of the capacitors 95 and 96. In particular, the smaller the capacitance of the capacitor 96 as compared to the capacitance of the capacitor 95, the more gradual the transition.

The resistor 89 and the capacitor 90 define a filter having the purpose of avoiding an excessive ripple of the bias current IBIAS of the oscillator 32.

From an examination of the characteristics of the frequency translator 72 made according to the present invention, the advantages that the frequency translator makes possible are evident.

In particular, it is to be emphasized that the frequency translator made according to the present invention can be used indifferently both in DC-DC converters operating as voltage regulators and in DC-DC converters operating as battery chargers, with consequent considerable savings from the design standpoint.

Finally, it is clear that modifications and variants can be made to the frequency translator described and illustrated herein without thereby departing from the protection scope of the present invention.

What is claimed is:

1. A frequency translator usable in a switching DC-DC converter of the type operating as a voltage regulator and as a battery charger, said DC-DC converter comprising waveform generating means receiving at an input a translation regulating signal and supplying at an output a comparison signal presenting a periodic pattern with a frequency correlated to said translation regulating signal, and detecting means supplying at an output a limiting signal indicative of normal operation or of operation in a current limitation condition of said DC-DC converter; the frequency translator comprising:

a first input that receives a first signal correlated to a present value of an output voltage of said DC-DC converter;

a second input that receives a second signal correlated to a nominal value of said output voltage;

an output that supplies said translation regulating signal, which is correlated to said first and second signals and is supplied to said waveform generating means to regulate a frequency translation of said comparison signal;

a third input receiving said limiting signal; and translation regulating means receiving at an input said first and second signals and said limiting signal and regulating a frequency translation of said comparison signal according to said first and second signals only when said DC-DC converter is operating in the current limitation condition.

2. The frequency translator according to claim 1, wherein said translation regulating means comprise frequency reducing means reducing the frequency of said comparison signal proportionally to the difference between said first and second signals only when said DC-DC converter is operating in the current limitation condition.

3. The frequency translator according to claim 1, wherein said translation regulating means comprise integrating means receiving at a first input said first signal, at a second input said second signal, and at a third input said limiting signal and supplying at an output a current regulating signal which is a function of said first and second signals and of said limiting signal; first current generating means supplying a reference current; second current generating means receiving at an input said current regulating signal and supplying at an output a limitation current correlated to said current regulating signal; and calculation means receiving at a first input said reference current and at a second input said limitation current and supply at an output a bias current which is a function of said reference current and of said limitation current and defines said translation regulating signal.

4. The frequency translator according to claim 3, wherein said integrating means implement the following relation:

$$VINT = \int VL(t) \cdot \left(1 - \frac{VFB}{VREF}\right) dt = \int VL(t) \cdot \left(\frac{VREF - VFB}{VREF}\right) dt$$

where VINT is said current regulating signal, VL is said limiting signal, VFB is said first signal, and VREF is said second signal.

5. The frequency translator according to claim 3, wherein said calculation means comprise algebraic adding means receiving at an input said reference current and said limitation current and supplying at an output said bias current, said bias current being correlated to the difference between said reference current and said limitation current.

6. The frequency translator according to claim 3, wherein said limitation current is proportional to said current regulating signal.

7. The frequency translator according to claim 3, wherein said reference current is constant.

8. A method of frequency translation for a switching DC-DC converter operating as a voltage regulator and as a battery charger, comprising the steps of:

(a) generating a first signal correlated to a present value of an output voltage of said DC-DC converter;

(b) generating a second signal correlated to a nominal value of said output voltage;

(c) generating a comparison signal having a periodic pattern with regulatable frequency;

(d) regulating the frequency of said comparison signal according to said first and second signals, wherein said step (d) comprises the steps of:

(d1) detecting a current limitation condition of said DC-DC converter; and (d2) regulating the frequency of said comparison signal according to said first and second signals only when said DC-DC converter is operating in the current limitation condition.

9. The method according to claim 8, wherein said step (d2) comprises the step of:

(d21) reducing the frequency of said comparison signal proportionally to the difference between said first and second signals only when said DC-DC converter is operating in the current limitation condition.

10. The method according to claim 8, wherein said step (d2) further comprises the steps of:

(d22) generating a current regulating signal by integrating a quantity correlated to said first and second signals and said limiting signal;

(d23) generating a reference current;

(d24) generating a limitation current according to said current regulating signal;

(d25) generating a bias current according to said reference current and to said limitation current; and (d26) regulating the frequency of said comparison signal according to said bias current.

11. The method according to claim 10, wherein said step (d25) comprises the step of generating said bias current as a function of the difference between said reference current and the limitation current.

12. The method according to claim 10, wherein said step (d22) comprises the step of implementing the following relation:

$$VINT = \int VL(t) \cdot \left(1 - \frac{VFB}{VREF}\right) dt = \int VL(t) \cdot \left(\frac{VREF - VFB}{VREF}\right) dt$$

where VINT is said current regulating signal, VL is said limiting signal, VFB is said first signal, and VREF is said second signal.

13. The method according to claim 10, wherein said limitation current is proportional to said current regulating signal.

14. The method according to claim 10, wherein said reference current is constant.

15. A switching DC-DC converter operating as a voltage regulator and as a battery charger, the DC-DC converter comprising:

a waveform generator having an input that receives a translation regulating signal and an output that supplies a comparison signal presenting a periodic pattern with a frequency correlated to the translation regulating signal;

an overload detector having an output that supplies a limiting signal indicative of the DC-DC converter is operating in an overload condition; and a frequency translator that includes:

a first input that receives a first signal correlated to a present value of an output voltage of the DC-DC converter;

a second input that receives a second signal correlated to a nominal value of the output voltage;

a third input coupled to the output of the overload detector; and an output that supplies the translation regulating signal to the waveform generator;

a translation regulator structured to produce the translation regulating signal as a function of the first and second signals in response to the overload detector indicating that the DC-DC converter is operating in the overload condition.

16. The DC-DC converter of claim 15 wherein the translation regulator comprises:

an integrator coupled to the first, second, and third inputs of the frequency translator, the integrator being structured to supply a current regulating signal that is a function of the first and second signals and of the limiting signal;

a first current generator that supplies a reference current;

a second current generator that supplies a limitation current correlated to the current regulating signal; and a subtraction stage having a first input coupled to the first current generator, a second input coupled to the second current generator, and an output coupled to the output of the frequency translator, the subtraction stage being structured to produce the translation regulating signal as a function of the reference current and of the limitation current.

17. The DC-DC converter of claim 16 wherein the integrator is structured to implement the following relation:

$$VINT = \int VL(t) \cdot \left(1 - \frac{VFB}{VREF}\right) dt = \int VL(t) \cdot \left(\frac{VREF - VFB}{VREF}\right) dt$$

where VINT is the current regulating signal, VL is the limiting signal, VFB is the first signal, and VREF is the second signal.

18. The DC-DC converter of claim 16 wherein the limitation current is proportional to the current regulating signal.

19. The DC-DC converter of claim 15 wherein the the translation regulator comprises:

a first switch that includes a control terminal driven by the first signal, the first switch being coupled to a first node;

a current generator that supplies a reference current;

a second switch that includes a control terminal driven by the second signal, the second switch being coupled by a second node to the current generator; and an integrator coupled to the first and second switches by the first and second nodes, respectively, and coupled to the third input of the frequency translator, the integrator being structured to supply a current regulating signal that is a function of the first and second signals when the limiting signal indicates that the DC-DC converter is in the overload condition, the current regulating signal causing a current to flow through the second switch that is equal to the translation regulation signal.

20. The DC-DC converter of claim 19 wherein the integrator includes:

a first switch having a first terminal coupled to the first node, a second terminal, and a control terminal responsive to the limiting signal from the overload detector;

a first capacitor coupled between the second terminal of the first switch and a voltage reference;

a second switch having a first terminal coupled to the second terminal of the first switch, a second terminal coupled to the second node, and a control terminal responsive to the limiting signal from the overload detector, the second switch operating in opposition to the first switch; and a second capacitor coupled between the second terminal of the second switch and the voltage reference.

\* \* \* \* \*